United States Patent
Ali et al.

(10) Patent No.: US 6,861,019 B2
(45) Date of Patent: Mar. 1, 2005

(54) METHOD OF MAKING A FABRIC-LESS PART

(75) Inventors: Asad S. Ali, Troy, MI (US); Terri L. Tahnoose, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 175 days.

(21) Appl. No.: 10/191,363

(22) Filed: Jul. 8, 2002

(65) Prior Publication Data

US 2002/0176981 A1 Nov. 28, 2002

Related U.S. Application Data

(62) Division of application No. 09/703,295, filed on Oct. 31, 2000, now Pat. No. 6,444,303.
(60) Provisional application No. 60/162,923, filed on Nov. 1, 1999.

(51) Int. Cl.$^7$ .............................................. B29C 44/06
(52) U.S. Cl. ..................... 264/46.4; 264/255; 264/309; 156/245
(58) Field of Search ................ 264/250, 255, 264/309, 46.4–46.6; 156/245

(56) References Cited

U.S. PATENT DOCUMENTS

| | | | |
|---|---|---|---|
| 3,669,499 A | * | 6/1972 | Semplonius et al. ........ 297/455 |
| 3,873,407 A | * | 3/1975 | Kumata et al. ............. 264/46.4 |
| 4,190,697 A | | 2/1980 | Ahrens |
| 4,246,213 A | * | 1/1981 | Takamatsu et al. ........ 264/46.7 |
| 4,294,880 A | * | 10/1981 | Nishida ...................... 428/315 |
| 4,800,984 A | | 1/1989 | Kerman |
| 5,273,695 A | | 12/1993 | Brown et al. |
| 5,389,317 A | * | 2/1995 | Grimmer .................... 264/46.5 |
| 5,662,996 A | | 9/1997 | Jourquin et al. |
| 5,786,394 A | | 7/1998 | Slaven |
| 5,824,407 A | | 10/1998 | Hayashi et al. |
| 5,938,993 A | * | 8/1999 | Greene ....................... 264/46.4 |
| 6,017,617 A | * | 1/2000 | Gardner et al. ........... 428/309.9 |
| 6,419,863 B1 | * | 7/2002 | Khac ......................... 264/46.6 |

FOREIGN PATENT DOCUMENTS

| | | |
|---|---|---|
| EP | 0 068 820 A1 | 6/1982 |
| EP | 0425 240 A2 | 3/1992 |

\* cited by examiner

*Primary Examiner*—Stefan Staicovici
(74) *Attorney, Agent, or Firm*—Bill C. Panagos

(57) ABSTRACT

A fabric-less part and a method of making same are disclosed. The fabric-less part may include a flexible polyurethane foam body, a high-density polyurethane foam backing layer bonded to the foam body, and a polyurethane elastomer skin bonded to the backing layer. Alternatively, the backing layer may be eliminated and the polyurethane elastomer skin is directly bonded to the flexible polyurethane foam body. The fabric-less part may be an automotive interior part such as a pillar trim, headrest, trim panel, instrument panel, door panel, armrest, or part of an automotive seat such as a seat cushion.

3 Claims, 3 Drawing Sheets

METHOD OF MAKING A FABRIC-LESS PART

CROSS-REFERENCE TO RELATED APPLICATION

This is a divisional application under 37 C.F.R. § 1.53(b) of prior application Ser. No. 09/703,295, filed on Oct. 31, 2000 now U.S. Pat. No. 6,444,303, and which claims the benefit of provisional application Ser. No. 60/162,923, filed on Nov. 1, 1999.

TECHNICAL FIELD

This invention relates to fabric-less parts, such as seats or cushions, and methods of making same.

BACKGROUND ART

The third largest cost in the production of a motor vehicle typically is seating. The largest portion of the seat cost is seating material. It typically makes up 30–40% of the total cost. By eliminating body cloth, one can reduce labor, material and lamination costs associated with such seats. Labor, material and lamination costs can also be reduced for other automotive interior parts which often include a cloth or fabric covering.

U.S. Pat. Nos. 5,273,695 and 5,786,394 are generally related to the present invention.

DISCLOSURE OF INVENTION

An object of the present invention is to provide a fabric-less part, such as an automotive interior part, and method of making same wherein the automotive interior part, such as an automotive seat, is created without using fabric and is capable of passing OEM specifications for low-end, high-volume vehicles. Such a product thereby eliminates the need for trim coverage which reduces overall seat costs significantly. Also, the flexibility of the seat design would increase because trim cover design limitations are removed.

Such automotive interior parts, such as a seat cushion, can be formed of various colors, texturing and shapes. For example, polyurethane can be produced to create skin for durability and matching interior color by paint or in-mold coating. Consequently, the resulting automotive seat has a lower cost and provides styling and versatility.

In carrying out the above object and other objects of the present invention, a fabric-less part is provided. In one embodiment, the part includes a flexible polyurethane foam body and a polyurethane elastomer/foam skin bonded to the foam body.

In another embodiment, a high-density polyurethane foam backing layer is bonded to the foam body wherein the skin is bonded to the backing layer.

The fabric-less part may be an automotive part such as a headrest, a trim panel, an instrument panel, a door panel, pillar trim, an armrest, or part of an automotive seat such as a seat cushion.

Also, the automotive interior part may include a top coat of polyurethane paint bonded to the skin.

The part may further include a second high-density polyurethane foam backing layer bonded to the foam body.

Further in carrying out the above objects and other objects of the present invention, a method of making a fabric-less part is provided. The method includes spraying a polyurethane elastomer/foam skin on an article-defining surface of a mold to form a polyurethane elastomer skin. The method also includes pouring a flexible polyurethane foam on the polyurethane elastomer/foam skin to form a foam body bonded to the skin.

The method may further include the step of spraying a coat on the article-defining surface before spraying the polyurethane elastomer.

Still further in carrying out the above object and other objects of the present invention, a method of making a fabric-less part is provided. The method includes spraying a polyurethane elastomer on an article-defining surface of a mold. The method also includes the step of dispensing high-density polyurethane foam on the polyurethane elastomer and then pouring flexible polyurethane foam on the high-density polyurethane wherein the polyurethane elastomer forms a skin, the high-density polyurethane foam forms a backing layer and the flexible polyurethane foam forms a body wherein the skin is bonded to the backing layer and the backing layer is bonded to the foam body.

The method may further include the step of spraying a polyurethane paint on the polyurethane elastomer skin to form a top coat thereon.

The method may further include pouring high-density polyurethane foam on the foam body to form a second backing layer bonded to the foam body.

The steps of spraying and pouring may be performed in an automated fashion such as by an industrial robot.

The benefits and material performances of a fabric-less part of the present invention are numerous. For example, Benefits:

There are numerous system advantages of the fabric-free seat:
  Lower seat cost;
  Water resistant/washable seat surface;
  Design and styling versatility;
  Thin seat profile;
  Flexibility of surface finish with dynamic colors, texture and gloss;
  100% recycling capability;
  One step low cost manufacturing process;
  Integrated seat heating system;
  Eliminate seat trim assembly.
Material Performance:
  Meet physical requirements:
  Dimensional stability;
  Humidity and aging;
  Flammability;
  Fogging;
  Compression;
  Elongation;
  Tear and tensile;
  Compression set;
  Sag.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
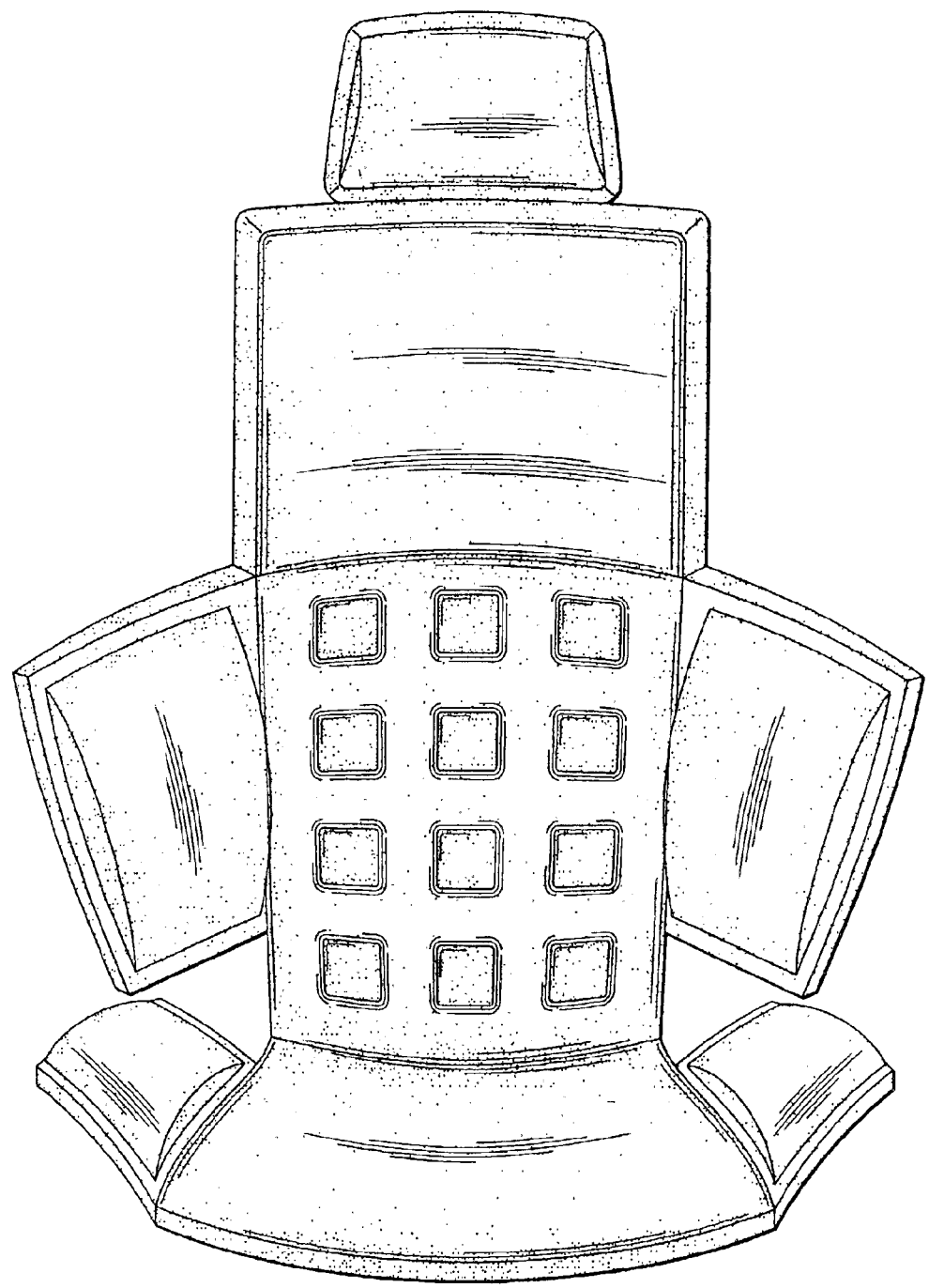
FIG. 1 is a front schematic view of a vehicle seat constructed in accordance with the present invention.

Referring now to the drawing Figures, there is illustrated in FIG. 1 an automotive seat constructed in accordance with the present invention wherein different segments of the seat are formed in accordance with the method illustrated in FIGS. 2–6. Each of the segments of the automotive seat of FIG. 1 typically includes a flexible polyurethane foam body, a high-density polyurethane foam backing layer bonded to the foam body, and a polyurethane elastomer skin bonded to the backing layer. However, it is to be understood that the high-density polyurethane foam backing layer may be eliminated so that the elastomer skin is directly bonded to the foam body. Optionally, a polyurethane paint top coat may be sprayed on the polyurethane elastomer skin. Such a paint may provide a "soft touch" for the resulting segment. Also, optionally, a second high-density polyurethane foam backing layer may be bonded to the foam body opposite the first backing layer for attaching the resulting part within an automotive interior.

In like fashion, the automotive interior part may comprise a pillar trim, a headrest, a trim panel, an instrument panel, a door panel, an armrest, or other automotive interior part of an automotive vehicle. Also, typically, the polyurethane elastomer skin may have a "look and feel" typically associated with the "look and feel" of the particular automotive interior part which is being replaced by the part of the invention.

For example, the polyurethane elastomer skin may have a porosity and surface texture so that it is breathable and is acoustically compatible with a sound system within the automotive interior. In other words, the polyurethane elastomer skin of the part may have the "look and feel" of leather, vinyl, or other seat or part covering.

Figure 2:
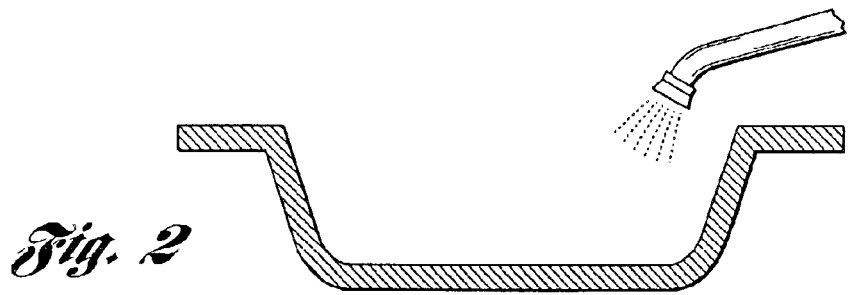
FIG. 2 is a side schematic view of a mold and illustrating a first step in forming an automotive interior part constructed in accordance with the present invention.

Referring now to FIGS. 2–6, there is illustrated a method for making an automotive interior part such as various segments of the automotive seat of FIG. 1. In FIG. 2, a conventional mold is spray-coated with a polyurethane elastomer/foam by automatic equipment such as a robot. Typically, the resulting skin is sprayed evenly and has a relatively uniform thickness of ½ millimeter to 1 millimeter thick.

Figure 3:
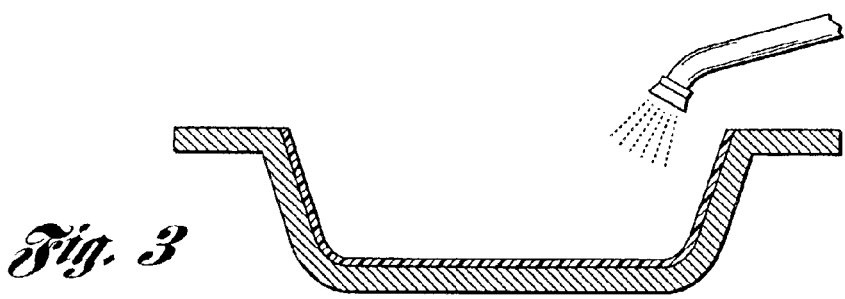
FIG. 3 is a side schematic view illustrating a second step in forming an automotive interior part constructed in accordance with the present invention.

Referring now to FIG. 3, there is illustrated an optional second step in forming the automotive interior part. Typically, automated equipment such as a robot sprays or pours high-density polyurethane foam on the polyurethane elastomer/foam skin to form a backing layer bonded to the elastomer skin. Typically, the high-density polyurethane foam has a density of approximately 4–5 pounds per cubic meter and has a relatively uniform thickness.

Figure 4:
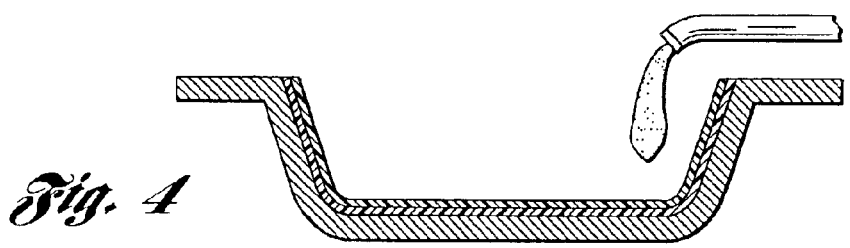
FIG. 4 is a side schematic view illustrating a third step in forming an automotive interior part constructed in accordance with the present invention.

Referring now to FIG. 4, there is illustrated the next step in forming the automotive interior part by pouring, also by automated equipment such as a robot, flexible polyurethane foam on the high-density polyurethane foam backing layer so that the backing layer bonds to the foam body. Typically, the flexible polyurethane foam has a density of approximately 2–4 pounds per cubic meter.

Figure 5:
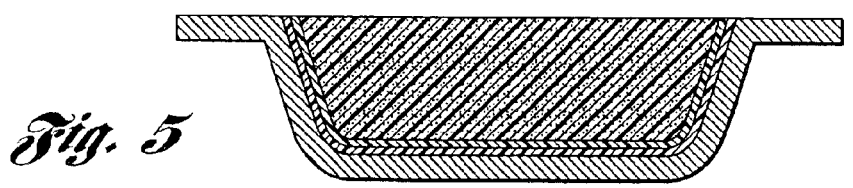
FIG. 5 is a side schematic view illustrating a completed automotive interior part disposed in the mold.

The resulting automotive interior part is then allowed to sit and cure in the mold as illustrated in FIG. 5.

Figure 6:
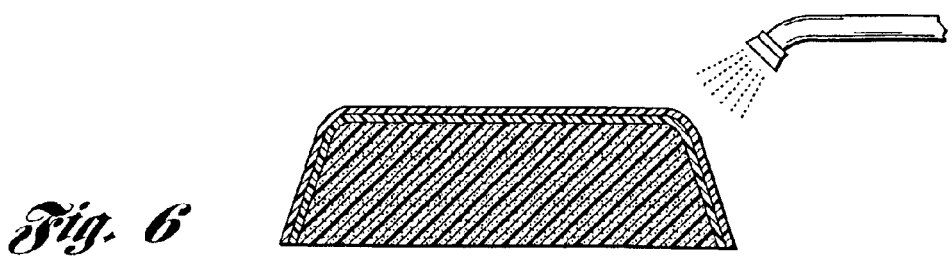
FIG. 6 is a side schematic view of the resulting automotive part being sprayed with polyurethane paint to form a top coat on the automotive part.

If desired, the resulting automotive interior part may be sprayed outside the mold with a polyurethane paint to form a top coat on the automotive interior part, as illustrated in FIG. 6.

Also, if desired, the part may include a second backing layer by pouring high-density polyurethane foam on the flexible polyurethane foam when the part is still in the mold. Such a second backing layer would help in securing the part within the automotive interior.

Figure 7:
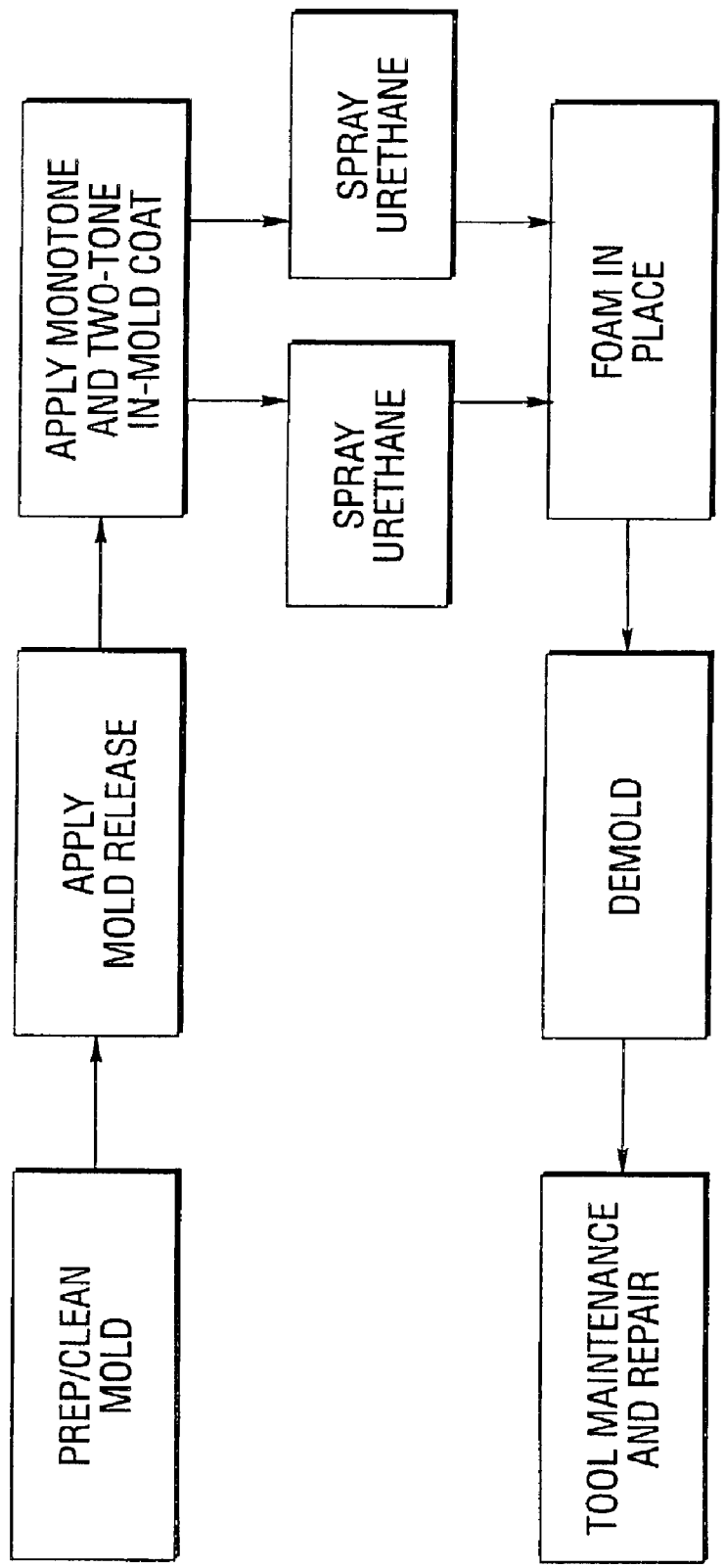
FIG. 7 is a block diagram schematic view of the various stations utilized in the method of the invention.

A preferred method for making a fabric-less part of the present invention utilizes seven stations as illustrated in FIG. 7 at which the following steps are performed:

Prep/clean mold;

Apply mold release;

Apply monotone and two-tone in-mold coat (IMC) (two-stage);

Spray urethane (two parallel stages);

Foam in place (i.e. FIP)(doors only);

Demold;

Tool maintenance repair.

Two separate foam stations with one metering unit may be located in an automated process line. Robots are preferably used for the steps of mold release, IMC, spray urethane and FIP for a complete system.

Process Description

Station 1 (Prep/Clean Mold). One operator cleans the mold of all debris.

Station 2 (Mold Release). A robot applies a mold release to the mold before every shot.

Station 3 (Two-tone In-mold Coat). The two-tone IMC station is temperature and humidity controlled. A first robot sets a mask into the mold. A second robot picks up the proper spray gun and applies a first color in the mold. The mask is then removed by the first robot and the mask is cleaned by an operator. A carrier holding the mold indexes to a third robot. The third robot picks up the proper spray gun and applies a second color in the mold for two-tone application.

Station 4 (Two PU Spray Urethane Stations). A forth robot is moved into position and a spray pattern is generated. The forth robot spray the part from a nozzle carried by the robot and then moves away from the part to be flushed. The forth robot then moves a wand over a rotating brush to clean the nozzle.

Station 5 (Foam In Place). The operator loads any insert desired into the tool. The mold closes and a fifth robot dispenses the foam into the mold. The mold is moved down the line to cure.

Station 6 (Demold). An operator removes the skins and foamed parts from the mold and place them on a rack. The skins and parts are moved to an inspection area.

Station 7 (Tool Maintenance and Repair). Each tool needs to be cleaned every 30 to 40 shots because of mold release build-up. The molds can be cleaned with dry ice or DBE.

Typically, the resulting interior part forms a laminated structure. However, it is to be understood that the flexible polyurethane foam and the high-density polyurethane foam may be mixed to a limited extent to provide a relatively smooth gradient of material therebetween rather than provide a sharp plane where the high-density polyurethane foam is bonded but separate from the flexible polyurethane foam.

While the best mode for carrying out the invention has been described in detail, those familiar with the art to which this invention relates will recognize various alternative designs and embodiments for practicing the invention as defined by the following claims.

What is claimed is:

1. A method of making a fabric-less part, the method comprising:

spraying a polyurethane elastomer on an article-defining surface of a mold to form a polyurethane elastomer skin;

dispensing a high-density polyurethane foam on the polyurethane elastomer skin to form a backing layer bonded to the skin;

pouring a flexible polyurethane foam on the backing layer to form a foam body bonded to the backing layer; and dispensing high-density polyurethane foam on the foam body to form a second backing layer bonded to the foam body.

2. The method as claimed in claim 1 further comprising spraying a coat on the article-defining surface before spraying the polyurethane elastomer.

3. The method as claimed in claim 1 further comprising spraying a polyurethane paint on the polyurethane elastomer skin to form a top coat on the part.

* * * * *